(12) United States Patent
Eltaher

(10) Patent No.: US 11,378,714 B2
(45) Date of Patent: Jul. 5, 2022

(54) LARGE DEPTH-OF-INVESTIGATION PULSED NEUTRON MEASUREMENTS AND ENHANCED RESERVOIR SATURATION EVALUATION

(71) Applicant: SAUDI ARABIAN OIL COMPANY, Dhahran (SA)

(72) Inventor: Yahia Ahmed Eltaher, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/097,703

(22) Filed: Nov. 13, 2020

(65) Prior Publication Data

US 2022/0155481 A1 May 19, 2022

(51) Int. Cl.
*G01V 5/10* (2006.01)

(52) U.S. Cl.
CPC .................................. *G01V 5/101* (2013.01)

(58) Field of Classification Search
CPC ..................................................... G01V 5/101
See application file for complete search history.

(56) References Cited

U.S. PATENT DOCUMENTS

| | | | |
|---|---|---|---|
| 2,996,618 A | 8/1961 | Goodman et al. | |
| 3,546,512 A | 12/1970 | Frentrop | |
| 4,046,764 A | 9/1977 | Marquis | |
| 4,780,266 A * | 10/1988 | Jordan | E21B 47/11 376/162 |
| 7,151,815 B2 * | 12/2006 | Ruddy | G01V 5/0091 376/158 |
| 8,338,777 B2 * | 12/2012 | Nikitin | G01V 5/101 250/269.6 |
| 8,692,185 B2 * | 4/2014 | Guo | G01V 5/101 250/269.4 |
| 8,759,748 B2 | 6/2014 | Navarro-Sorroche | |
| 10,466,383 B2 * | 11/2019 | Zhou | G01V 5/10 |
| 10,585,209 B2 * | 3/2020 | Inanc | G01V 5/125 |

(Continued)

FOREIGN PATENT DOCUMENTS

| | | |
|---|---|---|
| GB | 1048963 A | 11/1966 |
| WO | 2017008078 A2 | 1/2017 |

OTHER PUBLICATIONS

Lou, Tak Pui, "Compact D-D/D-T Neutron Generators and Their Applications", Dissertation, University of California, Spring 2003 (125 pages).

(Continued)

*Primary Examiner* — David P Porta
*Assistant Examiner* — Djura Malevic
(74) *Attorney, Agent, or Firm* — Osha Bergman Watanabe & Burton LLP

(57) ABSTRACT

A method, including emitting from a source of ultrafast neutrons within a logging tool deployed in a borehole, a pulse of ultrafast neutrons into an irradiated portion of a formation surrounding the borehole. The method further includes detecting, with one or more gamma ray detectors located at increasing distances from the source of ultrafast neutrons, a flux of stimulated gamma rays generated within the irradiated portion of the formation by the pulse of ultrafast neutrons; and determining, from the detected flux of stimulated gamma rays, one or more petrophysical properties of the irradiated portion of the formation.

23 Claims, 10 Drawing Sheets

(56) References Cited

U.S. PATENT DOCUMENTS

| | | | |
|---|---|---|---|
| 10,746,895 B2* | 8/2020 | Zhou | G01V 5/107 |
| 2003/0043951 A1* | 3/2003 | Akers | G01T 1/2985 |
| | | | 376/157 |
| 2005/0220247 A1* | 10/2005 | Ruddy | G01V 5/0091 |
| | | | 376/159 |
| 2006/0013350 A1* | 1/2006 | Akers | G01N 23/227 |
| | | | 376/156 |
| 2008/0232532 A1* | 9/2008 | Larsen | H05H 3/06 |
| | | | 376/108 |
| 2008/0232533 A1* | 9/2008 | Blanovsky | G21D 5/02 |
| | | | 376/172 |
| 2009/0057545 A1* | 3/2009 | Saenger | G01T 3/08 |
| | | | 250/269.4 |
| 2011/0062319 A1* | 3/2011 | Nikitin | G01V 5/101 |
| | | | 250/254 |
| 2011/0280356 A1* | 11/2011 | Tsang | G21G 1/08 |
| | | | 376/189 |
| 2013/0092827 A1* | 4/2013 | Nikitin | G01V 5/101 |
| | | | 250/254 |
| 2013/0105680 A1* | 5/2013 | Guo | G01V 5/104 |
| | | | 250/269.6 |
| 2015/0098544 A1* | 4/2015 | Blanovsky | G21C 5/20 |
| | | | 376/246 |
| 2015/0124921 A1 | 5/2015 | Groves et al. | |
| 2016/0349398 A1* | 12/2016 | Zhou | G01V 5/108 |
| 2019/0086576 A1* | 3/2019 | Inanc | G01V 5/125 |
| 2020/0081149 A1* | 3/2020 | Zhou | G01V 5/10 |
| 2020/0309973 A1* | 10/2020 | White | H01J 31/50 |
| 2021/0003738 A1* | 1/2021 | McCleskey | G01V 5/102 |
| 2021/0026034 A1* | 1/2021 | Pfutzner | G01V 5/08 |

OTHER PUBLICATIONS

Williams, Jonathan, "Development of a Neutron Generator Facility at Simon Fraser University", Thesis, Simon Fraser University, Spring 2015 (100 pages).

Meulders, J P et al., "Fast neutron yields and spectra from targets of varying atomic number bombarded with deutrons from 16 to 50 MeV (for radiobiology and radiotherapy)", Physics in Medicine and Biology, IOP Publishing Ltd, vol. 20, No. 2, Mar. 1975, pp. 235-243 (9 pages).

Dale, Gregory E., "Piezoelectric Transformer Neutron Generator (PTNG) Neutron Source for Well Logging", North Carolina State University Center for Engineering Applications of Radioisotopes Annual Meeting, Los Alamos National Laboratory, Oct. 2011 (21 pages).

Wang, Xin-guang et al., "A novel pulsed neutron uranium logging instrument with two epithermal neutron detectors", SEG New Orleans Annual Meeting, 2015, pp. 786-790, DOI: http://dx.doi.org/10.1190/segam2015-5907923.1 (5 pages).

Rose, David et al., "An Innovative Slim Pulsed Neutron Logging Tool", SPWLA 56th Annual Logging Symposium, Society of Petrophysicists and Well Log Analysts, Jul. 2015 (23 pages).

Nikitin, Anton et al., "Neutron Porosity Measurements Using a Pulsed Neutron Generator and LI-6 Glass Neutron Detectors", SPWLA 52nd Annual Logging Symposium, Society of Petrophysicists and Well Log Analysts, May 2011 (9 pages).

Thibideau, F.D., "A Pulsed Neutron Generator for Logging", The Log Analyst, Society of Petrophysicists and Well Log Analysts, Nov.-Dec. 1977, pp. 12-16 (5 pages).

Youmans, Arthur H. et al., "The Neutron Lifetime Log", SPWLA 5th Annual Logging Symposium, Society of Petrophysicists and Well Log Analysts, May 1964 (21 pages).

Eltaher, Yahia et al., "Critical Factors Affecting Pulsed Neutron Saturation Monitoring in Carbonate Reservoirs", SPE-192216-MS, Society of Petroleum Engineers, Apr. 2018 (11 pages).

Navarro, Juan and Weijun Guo, "High-Efficiency, High-Yield Pulsed Neutron Generators for the Well Logging Industry", SPE-181345-MS, Society of Petroleum Engineers, Sep. 2016 (9 pages).

Shypailo, R.J. and K.J. Ellis, "Prompt-gamma neutron activation analysis system design: Effects of D-T versus D-D neutron generator source selection", J Radioanal Nucl Chem, vol. 276, Apr. 2008, pp. 71-77 (7 pages).

* cited by examiner

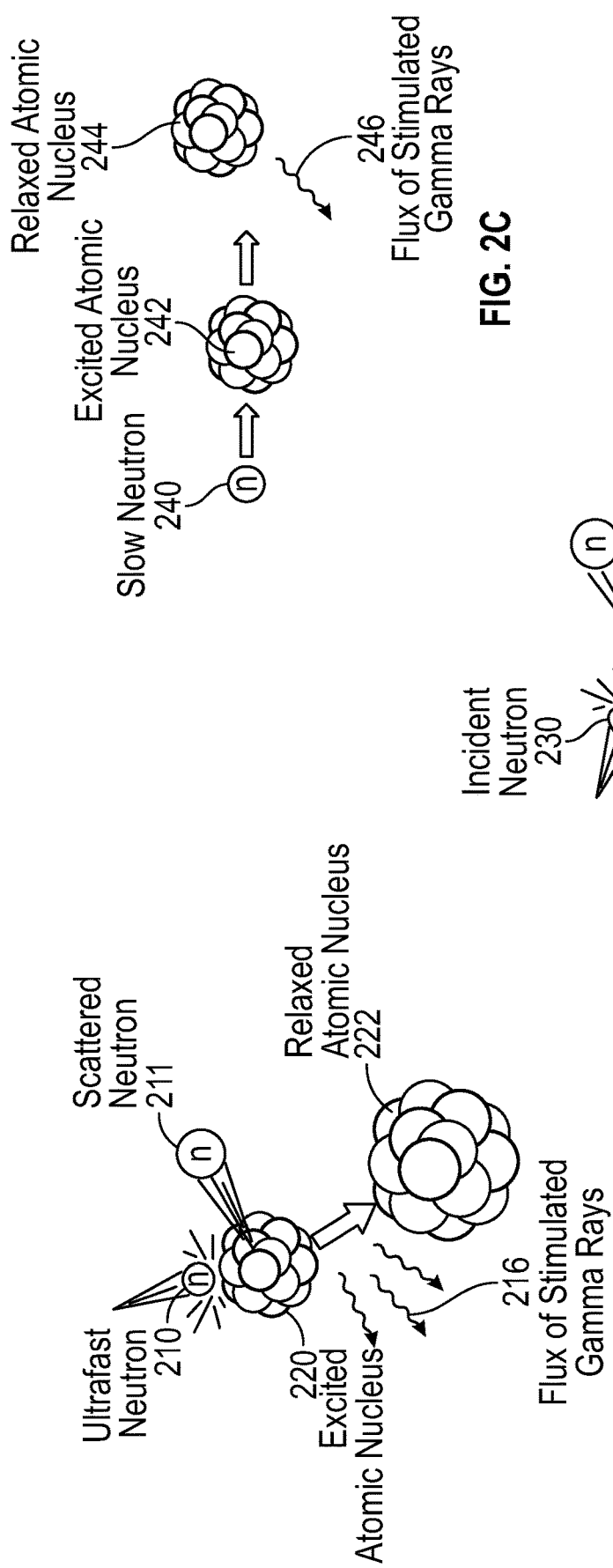
FIG. 2A
FIG. 2B
FIG. 2C

LARGE DEPTH-OF-INVESTIGATION PULSED NEUTRON MEASUREMENTS AND ENHANCED RESERVOIR SATURATION EVALUATION

BACKGROUND

Determining the hydrocarbon and water saturations of reservoir formations from within a cased oil or gas borehole plays a major role in hydrocarbon reservoir management. Methods of evaluating saturation using electromagnetic methods are typically prohibited because the casing is constructed from electrically conductive steel which shields the reservoir formation outside the casing. Instead traditional methods of evaluating saturation involve deploying a neutron logging tool capable of emitting neutrons and recording a flux of gamma rays stimulated within the formation by interactions between the neutrons and the constituent nuclei of the reservoir formation.

Existing neutron tools may generate neutrons through a radioactive decay process. For example, an isotope of Californium ($^{252}$Cf) which undergoes spontaneous fission to emit a neutron with an energy of approximately 2.4 Megaelectronvolts (MeV). Another example is the radioactive Americium ($_{95}^{241}$Am) which emits an alpha particle which in turn interacts with a Beryllium isotope ($_4^9$Be) to emit a neutron with an energy of approximately 4.5 MeV. These radioactive sources pose health, safety, and security risks, during storage, transport, and use.

A more recent solution to generating neutrons is to use a particle accelerator to fire a pulse of ions into a target. For example, a pulse of deuterium ions may be fired into a tritium target to generate a pulse of neutrons, each with an energy of approximately 14 MeV. These so called pulsed neutron tools do not generate radiation when not energized, so pose fewer health, safety, and security risks.

All existing downhole neutron logging tools have a limited depth of investigation (DOI) The DOI refers to the maximum distance, into the formation surrounding the borehole, within which the measurement is sensitive. This DOI is typically between 6 and 12 inches. This limited DOI may prevent the neutron logging tool from sampling portions of the reservoir formation beyond near-borehole regions of the reservoir formation that may be altered by drilling processes (such as drilling mud invasion), completion processes (such as cement filtration), and production processes (such as condensate formation). Thus, measurements of the neutron logging tool may not reflect the desired representative sample of the reservoir formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method, including emitting from a source of ultrafast neutrons within a logging tool deployed in a borehole, a pulse of ultrafast neutrons into an irradiated portion of a formation surrounding the borehole. The method further includes detecting, with one or more gamma ray detectors located at increasing distances from the source of ultrafast neutrons, a flux of stimulated gamma rays generated within the irradiated portion of the formation by the pulse of ultrafast neutrons; and determining, from the detected flux of stimulated gamma rays, one or more petrophysical properties of the irradiated portion of the formation.

In general, in one aspect, embodiments relate to a logging tool system, including a computer processor, a wireline connected to the computer processor, a logging tool housing, and a source of ultrafast neutrons mounted in the logging tool housing that emits a pulse of ultrafast neutrons. The logging tool system further includes one or more gamma ray detectors mounted in the logging tool housing at one or more distances from the source of ultrafast neutrons that detect and determine a characteristic of a flux of stimulated gamma rays stimulated in a formation by the pulse of ultrafast neutrons. The logging tool system still further includes a non-transitory computer memory that receives and stores a characteristic of the flux of stimulated gamma rays detected by the plurality of gamma ray detector.

In general, in one aspect, embodiments relate to a logging tool system, including a logging tool housing connected to the bottom-hole assembly of a drill-string, a computer processor mounted in the logging tool housing, and a source of ultrafast neutrons mounted in the logging tool housing that emits a pulse of ultrafast neutrons. The logging tool system further includes, one or more gamma ray detectors mounted in the logging tool housing at one or more distances from the source of ultrafast neutrons that detect and determine a characteristic of a flux of stimulated gamma rays stimulated in a formation by the pulse ultrafast neutrons. The logging tool system still further includes a non-transitory computer memory that receives and stores the characteristic of the flux of stimulated gamma rays detected by the gamma ray detector.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 2A, 2B and 2C show gamma ray stimulation mechanisms, according to one or more embodiments.

DETAILED DESCRIPTION

In the following detailed description of embodiments of the disclosure, numerous specific details are set forth in order to provide a more thorough understanding of the disclosure. However, it will be apparent that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
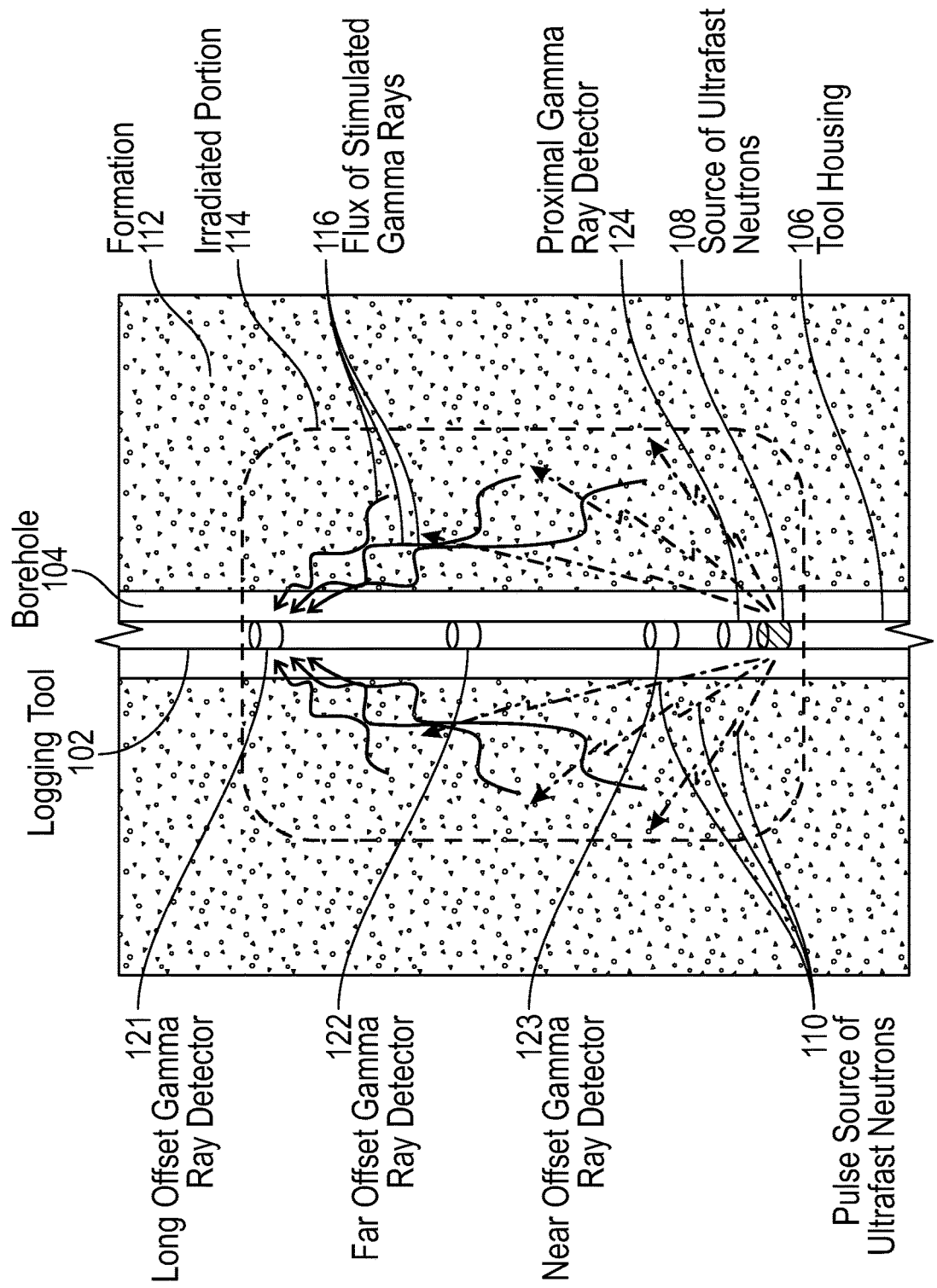
FIG. 1 shows a pulsed ultrafast neutron logging tool deployed in a borehole, in accordance with one or more embodiments.

FIG. 1 depicts a pulsed ultrafast neutron logging tool (102) deployed in a borehole (104), in accordance with one or more embodiments. The logging tool may comprise a tool housing (106), which is deployed using a conveyance mechanism, not shown. The conveyance mechanism may be a wireline, a slick-line, a coil-tubing, or a drill-pipe attached to a bottom-hole assembly that may include the logging tool housing (106).

FIG. 1 further depicts, in accordance with one or more embodiments, a source of ultrafast neutrons (108) mounted in, or on, the tool housing (106). Herein, we define ultrafast neutrons as neutrons with a kinetic energy level greater than 20 Megaelectronvolts (MeV), but not greater than 500 MeV. Note, that none of the neutron sources which use spontaneous radioactive decay, nor the pulsed neutron tools described in the "Background"section above generate ultrafast neutrons under this definition.

When activated the source of ultrafast neutrons emits a pulse of ultrafast neutrons (110) into the borehole (104), and from the borehole (104) into a portion of the formation (112) surrounding the borehole. Herein, we denote this portion of the formation into which a pulse of ultrafast neutrons is emitted as the "irradiated portion" (114) of the formation (112). The duration of a pulse of ultrafast neutrons (110) may vary from one embodiment to another. However, a typical duration of a pulse of ultrafast neutrons (110) may be 20 microseconds (sec). In other embodiments, the duration of the pulse of ultrafast neutrons (110) may lie between 1 μsec and 3000 μsec.

When not activated the source of ultrafast neutrons (108) does not emit significant levels of neutron radiation. Nor, when not activated, does the source of ultrafast neutrons (108) emit alpha, beta, nor gamma ray radiation. This is a highly desirable feature of a logging tool (102) because it reduces health, safety and security concerns when the tool is stored, shipped, and prepared for use.

Further, in accordance with one or more embodiments, a plurality of gamma ray detectors (121, 122, 123, 124) may be mounted in, or on, the tool housing (106) at increasing distance from the source of ultrafast neutrons (108). Herein, we focus our attention on an embodiment that has four gamma ray detectors mounted in, or on, the tool housing (106) that we denote "proximal" (121), "near" (122), "far" (123), and "long" (124). The proximal gamma ray detector (121) may be separated from the source of ultrafast neutrons by a distance of 30 centimeters (cm). The near gamma ray detector (122) may be separated from the source of ultrafast neutrons by a distance of 60 cm. The far gamma ray detector (123) may be separated from the source of ultrafast neutrons by a distance of 100 cm, and the long gamma ray detector (124) may be separated from the source of ultrafast neutrons (108) by an offset of 200 cm. Other embodiments may have more, or fewer, than four gamma ray detectors mounted on, or in, the tool housing (106). Furthermore, they may be distributed at distances from the source of ultrafast neutrons (108), and from each other, at distances other than described previously in this paragraph. The gamma ray detectors (121, 122, 123, 124) may located at distances from the source of ultrafast neutrons which may be farther or shorter than the exemplary embodiments disclosed above.

The embodiment depicted in FIG. 1 shows the source of ultrafast neutrons (108) located below the gamma ray detectors (121, 122, 123, 124). However, in other embodiments the source of ultrafast neutrons (108) may be located above the gamma ray detectors (121, 122, 123, 124) without impairing the operation of the embodiment.

In accordance with one or more embodiments, the source of ultrafast neutrons (108) emits a pulse of ultrafast neutrons (110) when activated into the irradiated portion (114) of the formation (112) surrounding the borehole (104). Within the irradiated portion (114) of the formation (112) the ultrafast neutrons interact with atomic nuclei of material from which the irradiated portion (114) of the formation (112) is composed. The result of the interaction between the pulse of ultrafast neutrons (110) and the atomic nuclei of the material from which the irradiated portion (114) of the formation (112) is composed is the stimulation of a flux of stimulated gamma rays (116). A portion of this flux of stimulated gamma rays (116) may be detected by at least one of the plurality of gamma ray detectors (121, 122, 123, 124) mounted on, or in, the tool housing (106).

FIGS. 2A, 2B, and 2C, depict three categories of interaction between an ultrafast neutron and an atomic nuclei in the irradiated portion of the formation that result in the stimulation of gamma rays. FIG. 2A shows, in accordance with one or more embodiments, the stimulation of a flux of stimulated gamma rays (216) by inelastic scattering of the ultrafast neutron (210) by an atomic nucleus (220). In inelastic scattering of an ultrafast neutron (210), the incident ultrafast neutron (210) strikes the atomic nucleus (220) and excites the atomic nucleus (220), raising one or more of the constituent nucleons of the atomic nucleus (220) to a higher energy level. The scattered neutron (211) continues to travel though the irradiated portion of the formation (112) with a reduced energy, or equivalently a reduced velocity. After inelastic scattering the excited atomic nucleus (220) quickly relaxes to its stable energy state emitting a stimulated gamma ray (216) as it does so. Typically, the excited atomic nucleus (220) relaxes to its stable state, a relaxed atomic nucleus (222), and emits a stimulated gamma ray (216) within a few micro-seconds (μsec) after the impact of an ultrafast neutron (210).

FIG. 2B depicts, in accordance with one or more embodiments, the simulation of a flux of stimulated gamma rays (236) by elastic scattering of the incident neutron (230) by an atomic nucleus (232). In elastic scattering of a neutron, the incident neutron (230) strikes the atomic nucleus (232) without exciting the atomic nucleus (232), nor raising any of the constituent nucleons of the atomic nucleus (232) to a higher energy level. However, the energy of the scattered neutron (231) is reduced, and the direction of motion of the scattered neutron (231) may be altered as it travels on though the irradiated portion of the formation (112). The energy lost by the neutron (231) is emitted as a flux of stimulated gamma rays (236), and of the flux of stimulated gamma rays (236), a portion may be detected by the gamma ray detectors (121, 122, 123, 124) mounted in, or on, the tool housing (106). Typically, the ratio of elastic scattering to inelastic scattering of neutrons increases at the energy of the neutron decreases. Thus, elastic scattering of neutrons dominates the stimulation of gamma rays at intermediate times, after the ultrafast neutrons (210) have been reduced in energy, or slowed, by earlier inelastic scattering events. Herein, we take "intermediate times" to mean times ranging from 5 μsec and 50 μsec after the end of emission of a pulse of ultrafast neutrons (210).

FIG. 2C depicts the absorption of neutrons by atomic nuclei, according to one or more embodiments. Neutrons (240) are usually absorbed when their energy has declined to a value of 0.025 eV or lower, which typically occurs after a plurality of inelastic and elastic scattering events. After the neutron (240) has been absorbed by an atomic nucleus (242), the atomic nucleus (242) emits a stimulated gamma ray (246), denoted a "thermal capture" gamma ray. A portion of the flux of these stimulated gamma rays (246) may be detected by the gamma ray detectors (121, 122, 123, 124) mounted on, or in, the tool housing (106). Since the ultrafast neutrons (210) must first be reduced in energy, or slowed, by a plurality of inelastic and elastic scattering events before they can be absorbed, or captured by an atomic nucleus (242), the thermal capture stimulated gamma rays (246) typically dominate the flux of stimulated gamma rays (246) at long times after the end of the emission of the pulse of ultrafast neutrons (210). Herein, we take "long times" to mean times greater than 50 μsec after the end of emission of a pulse of ultrafast neutrons (210).

Figure 3:
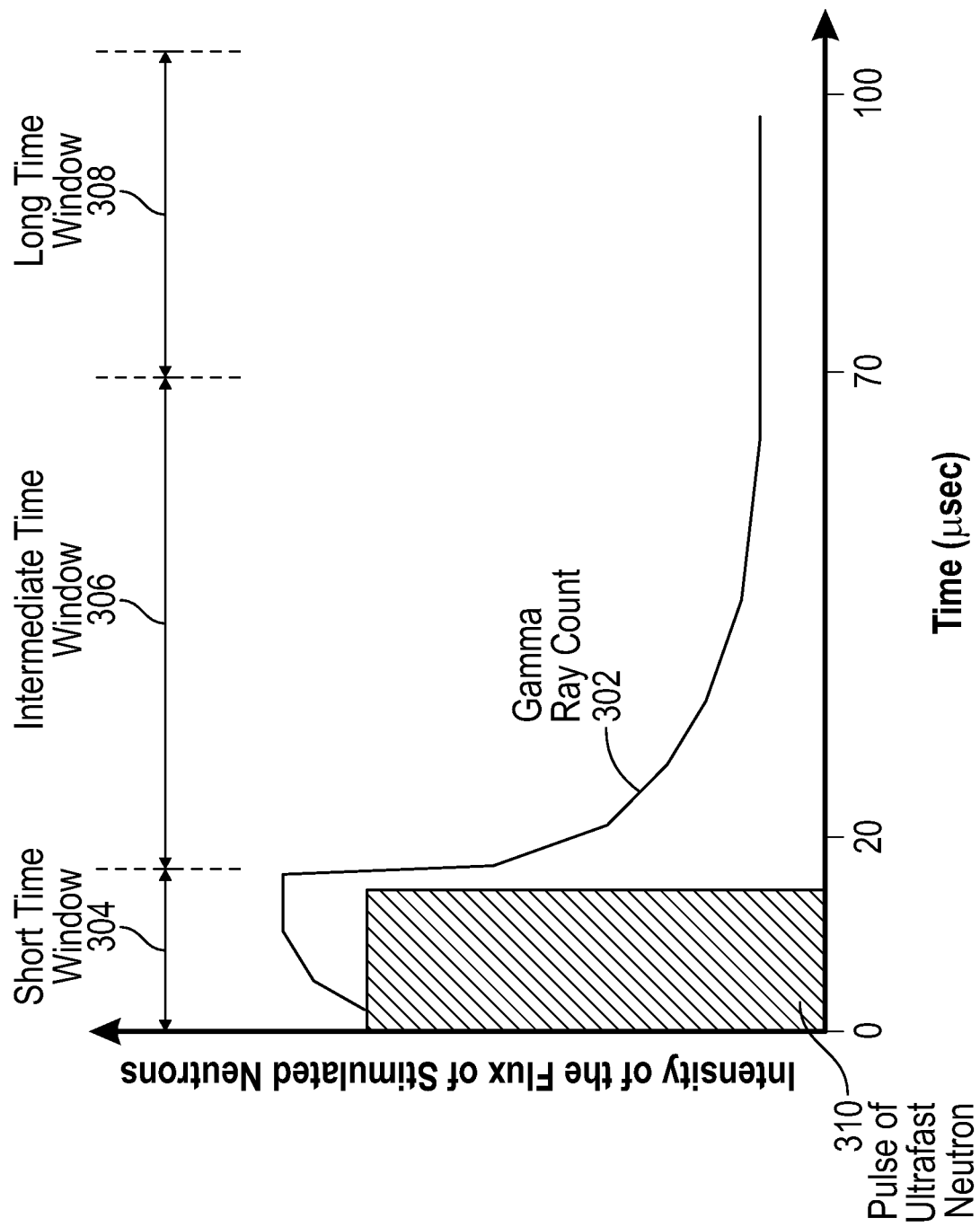
FIG. 3 shows an example for the response of a formation to a neutron pulse, in accordance with one or more embodiments.

FIG. 3 shows the gamma ray count (302), a measurement of the intensity of the flux of stimulated gamma rays, as a function of time after the beginning of a pulse of ultrafast neutrons, in accordance with one or more embodiments. The beginning pulse of ultrafast neutrons (310) may define the origin of the time axis. The pulse of ultrafast neutrons (310) may last for 20 μsec, according to one or more embodiments. In other embodiments, the duration of the pulse of ultrafast neutrons (310) may lie between 1 μsec and 100 μsec. The gamma ray count (302) may be dominated in a short-time window (304) by stimulated gamma rays generated by inelastic collisions between the pulse of ultrafast neutrons (310) and the atomic nuclei of the material of which the irradiated portion (114) of the formation is composed. The gamma ray count (302) may be dominated in an intermediate-time window (306) by stimulated gamma rays generated by elastic collisions between neutrons and the atomic nuclei of the material of which the irradiated portion of the formation is composed. Finally, the gamma ray count may be dominated in a long-time window (308) by stimulated gamma rays generated by thermal capture of neutrons by the atomic nuclei of the material of which the irradiated portion (114) of the formation is composed. The particular timescale and demarcations between short-time, intermediate-time and long-time windows shown in FIG. 3 reflect the current technology and are shown for illustration only. These demarcation times may be significantly different for an ultrafast pulsed neutron tool.

According to one or more embodiments, petrophysical properties of the irradiated portion of the formation (114) may be determined from the intensity and the properties of the flux of stimulated gamma rays (116) in the short-time window (304), the intermediate-time window (306), and the long-time window (308). Inelastic neutron scattering, is dominated by carbon and oxygen nuclei. Thus, the carbon and oxygen content of the irradiated portion of the formation (114) may be determined from the gamma ray count (302) measured during the short-time window (304), from which a salinity-independent based formation water saturation can be calculated. Elastic neutron scattering is dominated by hydrogen nuclei and hydrogen is most abundant in pore fluids, such as water and hydrocarbon. Thus, the porosity of the irradiated portion of the formation (114) may be determined from the gamma ray count (302) measured during the intermediate-time window (306). Finally, thermal capture of slow neutrons may be dominated by heavier nuclei, such as silicon, calcium, chlorine, sulfur, iron, titanium, and gadollinium. Thus, the amount of these elements, as well as other formation and fluid elements present in the irradiated portion of the formation and a salinity-dependent based formation water saturation may be determined from the gamma ray count (302) measured during the long-time window (308).

The size of the irradiated portion of the formation (114), in particular the distance it extends into the formation (112) away from the borehole (104), is an important parameter. This distance, known as the depth of investigation (DOI), determines whether the pulsed neutron logging tool (102) makes a representative sampling of the formation (112). In particular, it determines at least in part whether the irradiated portion of the formation (114) includes a portion of the formation beyond near-borehole regions of the formation that may be altered by drilling processes (such as drilling mud invasion), completion processes (such as cement filtration), and production processes (such as condensate formation). Thus, measurements by the pulsed neutron logging tool may not reflect the desired representative petrophysical properties of the formation if the DOI is inadequate.

Figure 4:
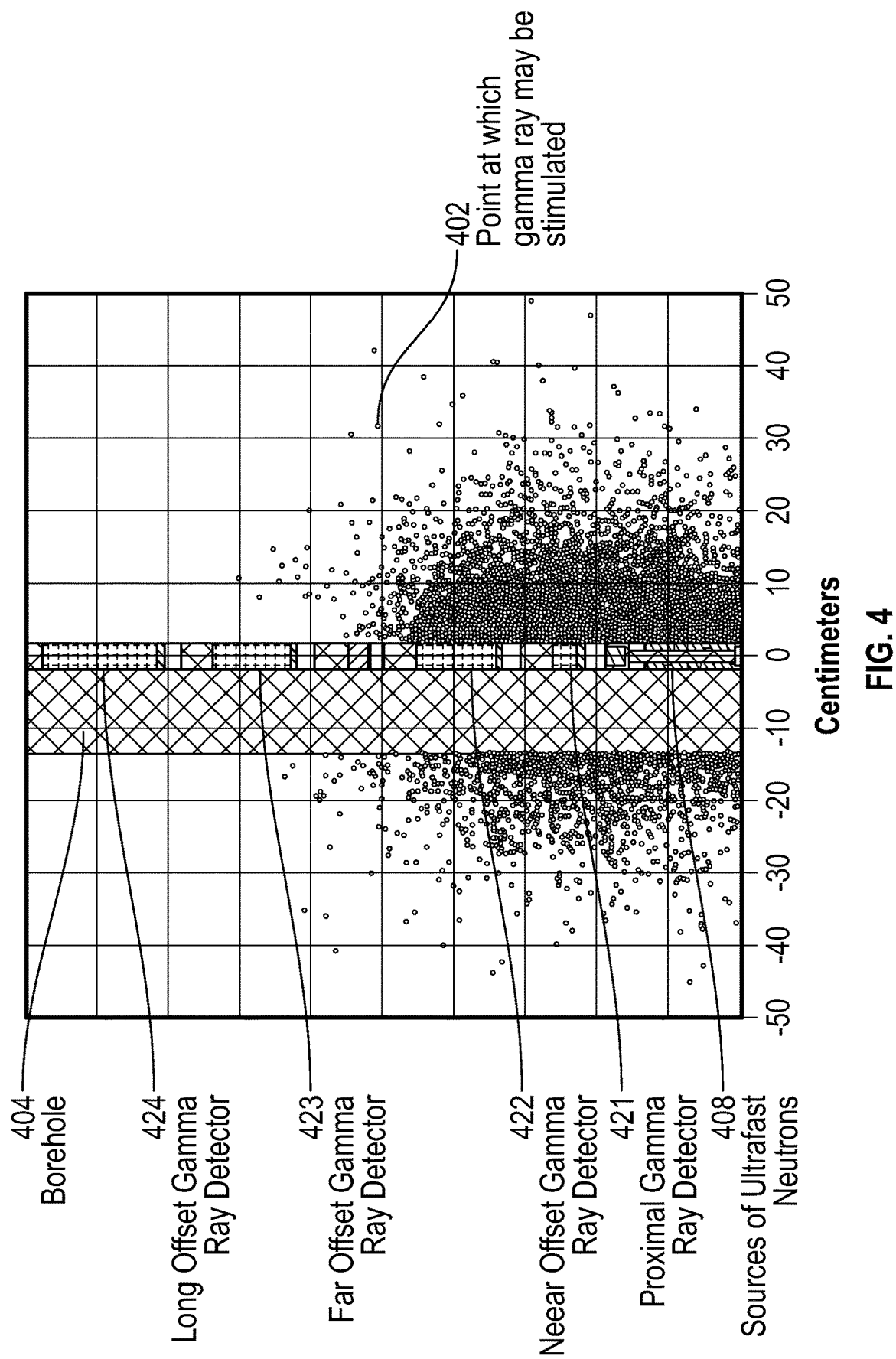
FIG. 4 shows a simulation of the origin points of stimulated gamma rays, in accordance with one or more embodiments.

FIG. 4 shows a simulation of the flux of stimulated gamma rays (116) by a pulse of ultrafast neutrons (110) in a formation (112) penetrated by a borehole (104), in accordance with one or more embodiments. The simulation is conducted using a Monte Carlo N-Particle algorithm and code developed at Los Alamos National Laboratory and described in Briesmeister, "MCNP™—A General Monte Carlo N-Particle Transport Code", (March 2000) LA-13709-M, Los Alamos Report. The black dots depict the points within the formation at which a gamma ray may be stimulated (402) by a neutrons emitted by a source of ultrafast neutrons (408) and detected by the plurality of gamma ray detectors (421, 422, 423, 424). The density of points at which gamma rays may stimulated (402) is greater close to the borehole (404) and decreases with increasing distance from the borehole (404). The DOI of the pulsed neutron tool may be determined from this simulation of the spatial distribution of points at which gamma rays are stimulated (402).

Figure 5A:
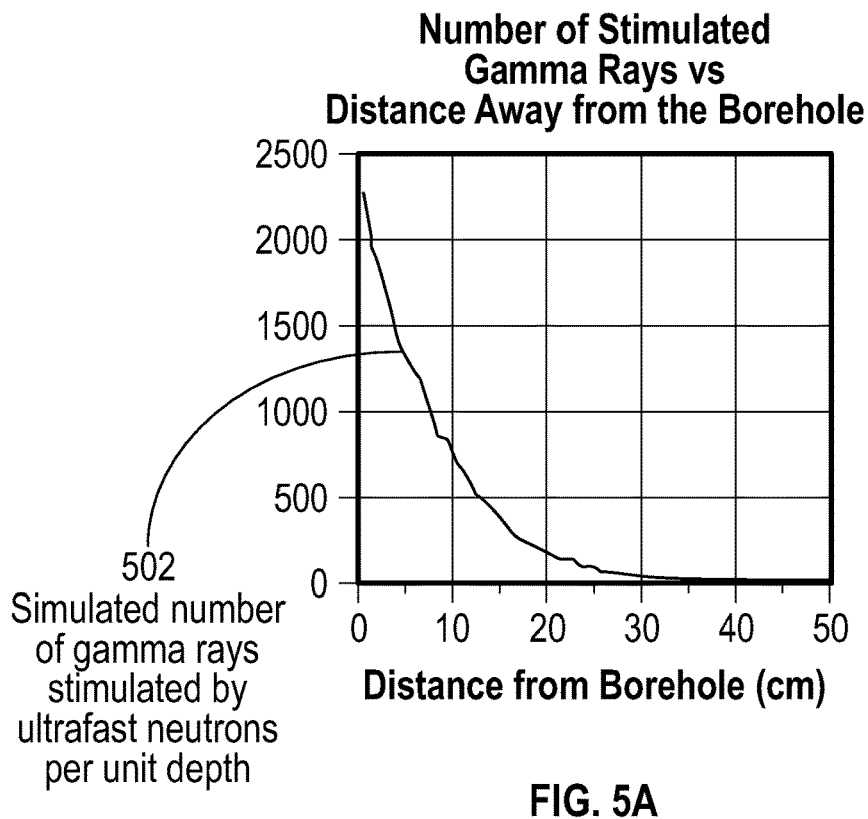
FIGS. 5A and 5B show a depth of investigation of a neutron pulse, in accordance with one or more embodiments.

FIG. 5A shows, in accordance with one or more embodiments, the simulations of the number of gamma rays stimulated by the ultrafast neutrons per unit depth (502) for the near gamma ray detector (422) as a function of distance from the borehole (404). As expected from the results displayed in FIG. 4 the number of stimulated gamma rays (502) decays rapidly with increasing depth into the formation (112).

Figure 5B:
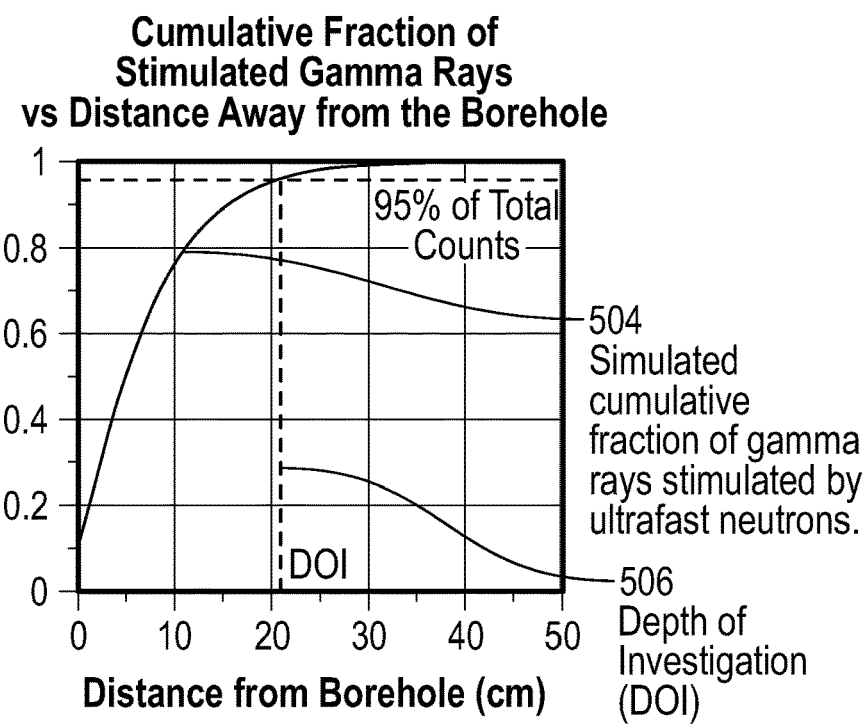

FIG. 5B illustrates the simulated cumulative fraction of gamma rays stimulated by ultrafast neutrons (504) as a function of distance from the borehole. Herein, we define the depth of investigation (DOI) (506) as the distance from the borehole at which the simulated cumulative fraction of gamma rays stimulated by ultrafast neutrons (504) reaches 95% of the maximum value. In other embodiments a different fraction, such as 90% or 98%, may be used to define the DOI (506) without materially effecting the effectiveness of the embodiment.

FIG. 6 shows the average value of the DOI (506), in accordance with one or more embodiments, of multiple simulations for a variety of borehole, and formation fluid compositions, listed in Table 1 below. In all the examples shown, the formation was taken to be a 25% porosity limestone, and the logging tool (102) was modeled as being deployed in an uncased 6¼ inches diameter borehole (104).

TABLE 1

| Block # | Borehole Fluid (Oil/Water Ratio) | Formation Fluid (Oil/Water Ratio) |
|---|---|---|
| 1 | 50/50 | 50/50 |
| 2 | 100/50 | 30/70 |
| 3 | 100/50 | 90/10 |
| 4 | 0/100 | 30/70 |
| 5 | 0/100 | 90/10 |

Figure 6A:
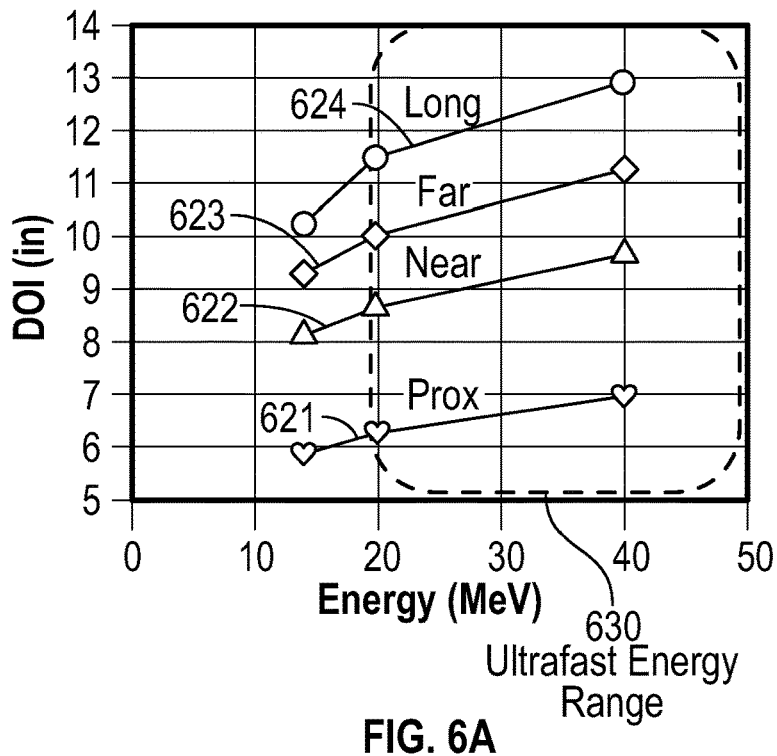
FIGS. 6A, 6B, 6C and 6D show the increase in the depth of investigation with neutron energy, in accordance with one or more embodiments.

FIG. 6A shows the simulated DOI (506) in inches for inelastic scattering stimulated gamma rays, in accordance with one or more embodiments. Results are shown for the proximal (621), near (622), far (623), and long gamma ray detectors (624) for pulses of neutrons with energies of 14 MeV, 20 MeV, and 40 MeV. The DOI (506) for the neutrons with an energy of 14 MeV may be regarded as a baseline value because 14 MeV is the energy of current pulsed neutron logging tools. FIG. 6A shows that greater neutron energy, and greater neutron source to gamma ray detector separation, corresponds to greater DOI (506). In particular, ultrafast neutrons with energy levels in the ultrafast energy range (630), greater than 20 MeV have a much greater DOI (506).

Figure 6B:
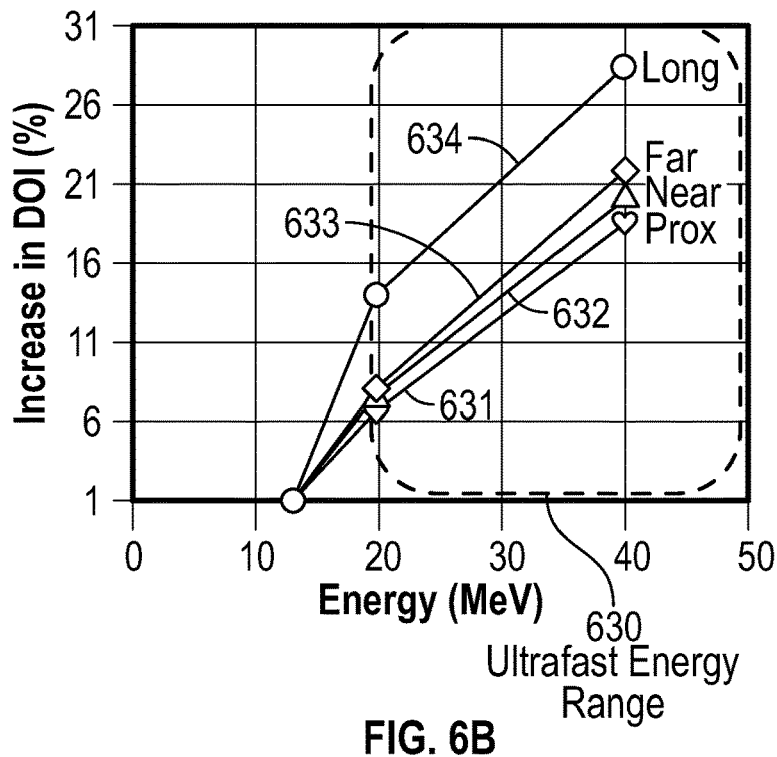

FIG. 6B displays this increase in DOI (506) as a percentage increase over the baseline 14 MeV value. The proximal (631), near (632), and far (633) gamma ray detectors all have an increase in DOI (506) of between 6% and 8% for ultrafast neutrons with an energy of 20 MeV and between 18% and 22% for ultrafast neutrons with an energy of 40 MeV. The increase in DOI (506) for the long (634) gamma ray detector is even greater. For neutrons with an energy of 20 MeV the DOI (506) for the long (634) gamma ray detector increases by 14%, and for an energy of 40 MeV by 28%, over the 14 MeV baseline values.

Figure 6C:
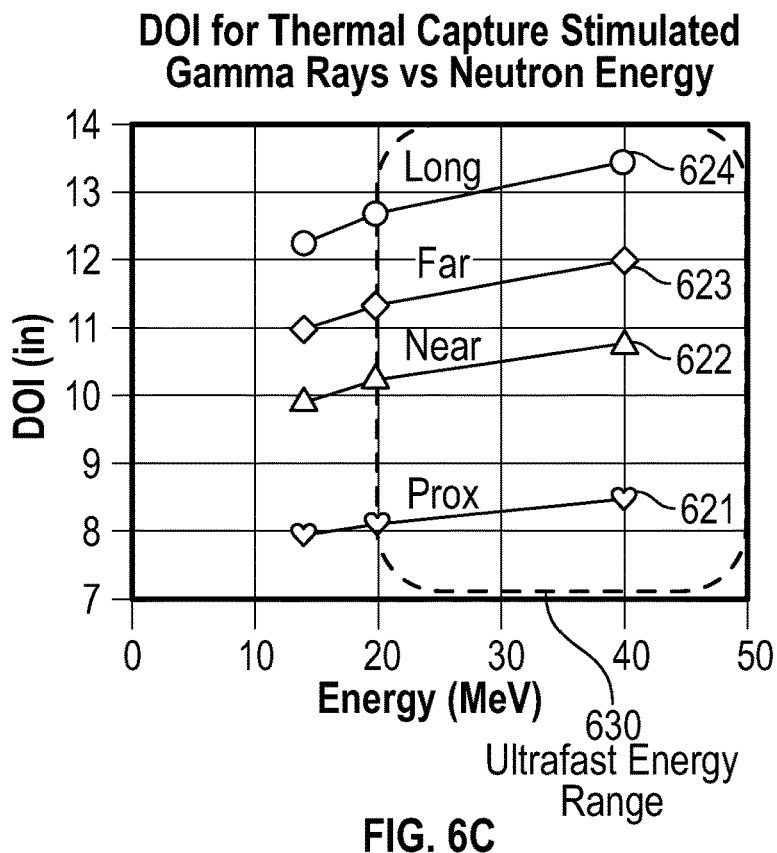

FIG. 6C shows the simulated DOI (506) in inches for thermal capture stimulated gamma rays, in accordance with one or more embodiments. Results are shown for the proximal (621), near (622), far (623), and long (624) gamma ray detectors for neutrons with energies of 14 MeV, 20 MeV, and 40 MeV. The DOI (506) for the neutrons with an energy of 14 MeV may be regarded as a baseline value because 14 MeV is the energy of current pulsed neutron logging tools. FIG. 6C shows that greater neutron energy, and greater neutron source to gamma ray detector separation corresponds to greater DOI (506). In particular, ultrafast neutrons with energy levels in the ultrafast energy range (630), greater than 20 MeV have a much greater DOI (506).

Figure 6D:
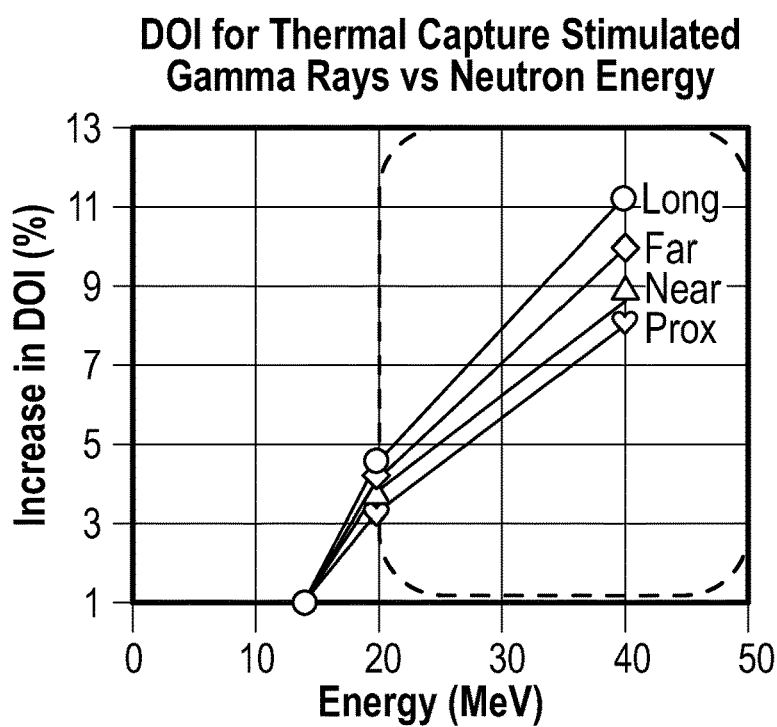

FIG. 6D displays this increase in DOI (506) as a percentage increase over the baseline 14 MeV value. All gamma ray detectors have an increase in DOI (506) of between 3% and 4% for ultrafast neutrons with an energy of 20 MeV and between 8 and 11% for ultrafast neutrons with an energy of 40 MeV.

Figure 7:
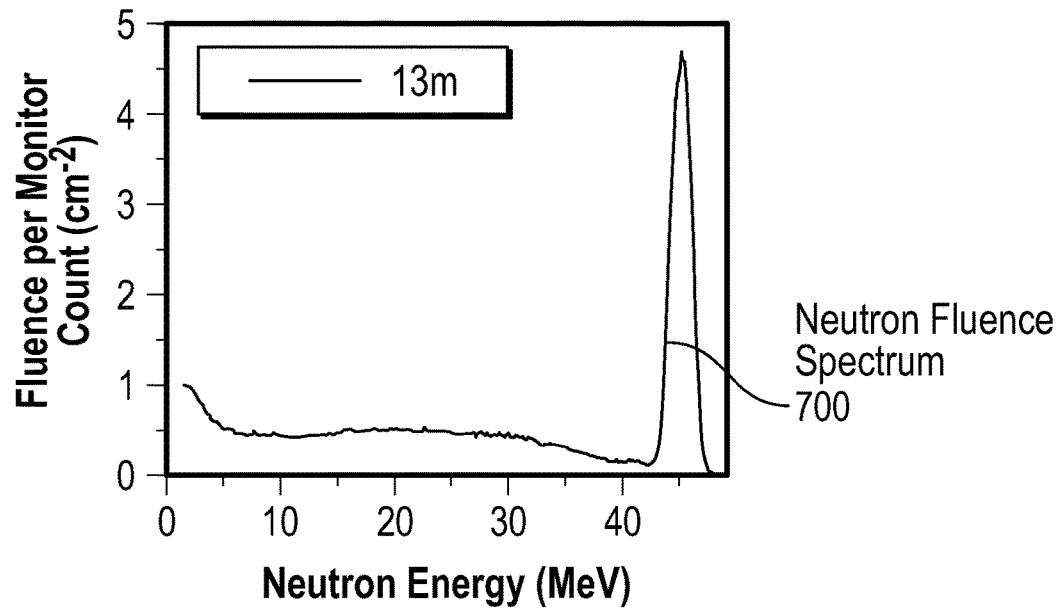
FIG. 7 shows a neutron fluence spectrum, in accordance with one or more embodiments.

FIG. 7 shows the neutron fluence spectrum (700) as a function of neutron energy for a target comprising an isotope of lithium ($^7$Li) struck by a beam of high-energy protons, in accordance with one or more embodiments, as taught by Matsumoto et al., "Development of the high-energy neutron fluence rate standard field in Japan with a peak energy of 45 MeV using $^7$Li(p,n) $^7$Be reaction at TIARA", Journal of Nuclear Science And Technology, VOL. 54, NO. 5, 529-538 (Feb. 22, 2017). Herein, we define high energy protons as protons with an energy greater than 25 MeV. In the embodiment shown in FIG. 7 the high-energy protons have an energy of 50 MeV. The fluence of a pulse of neutrons is defined as the number of neutrons per unit area, per second. The nucleus of the isotope of $^7$Li itself contains three protons and four neutrons. When impacted by a high energy proton $^7$Li captures the proton and ejects one of the neutrons and transforms into a Beryllium isotope, $^7$Be, which contains four protons and three neutrons. This reaction is typically denoted as a "$^7$Li(p,n)$^7$Be" reaction. As FIG. 7 shows the neutron fluence spectrum (700) generated by a pulse of protons each with an energy of 50 MeV striking a target rich in $^7$Li is strongly peaked at 45 MeV.

Although $^7$Li is an excellent producer of ultrafast neutrons when impacted by high energy protons, $^7$Li also has a relatively low melting point of 181° C., which may be disadvantageous for use in a borehole. In other embodiments, lithium compounds, such as lithium hydride ($^7$Li H) which have neutron emission rates 30% lower than pure $^7$Li, but a melting point of 690° C. may be used. Although lithium hydride may be the preferred embodiment, in still other embodiments the target may be constructed from lithium deuteride ($^7$LiD) with a melting point above 600° C. as taught by Barjon & Breynat "High Energy Neutron Generator", U.S. Pat. No. 4,666,651 (May 19, 1987). Barjon & Breynat teach how to generate pulse of ultrafast neutrons by colliding a beam of high-energy protons with a target of $^7$LiD to produce a beam of neutrons for medical therapeutic applications. Barjon & Breynat also teach how the geometrical design of the target may modify the fluence spectrum of the emitted neutrons, including ultrafast neutrons of at least 25 MeV.

Although the preferred embodiment, described above, uses protons (hydrogen ions) as the high energy particles to strike the target, other ions may be used in other embodiments. For example, deuterium ions might be used to strike a target composed of carbon or beryllium.

Figure 8:
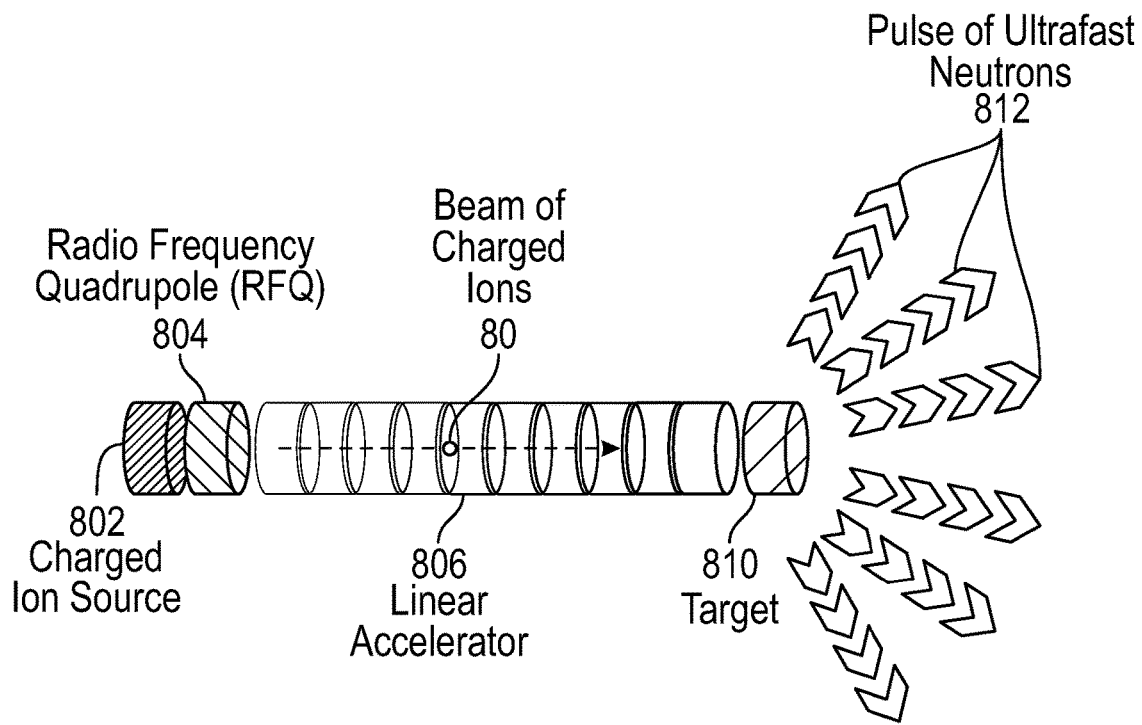
FIG. 8 shows a high-energy pulsed neutron source, in accordance with one or more embodiments.

FIG. 8 shows the functional design of a pulsed source of ultrafast neutrons (110), in accordance with one or more embodiments. The design shown in FIG. 8 may contains four primary elements: a charged ion source (802), a radio frequency quadrupole (RFQ) (804), a linear accelerator (806), and a target (810).

The design of the charged ion source (802) may depend upon the charged ions selected for a particular embodiment. In the preferred embodiment, which uses protons (hydrogen ions) as charged ions, hydrogen gas may be injected into an electric field which strips the electrons from the hydrogen atoms to produce protons. In another embodiment, a deuterium ion source may be constructed by saturating a thin titanium foil with deuterium. The properties of the titanium foil allows the foil to hold two atoms of deuterium for each atom of titanium, creating a deuterium dense cathode. A high voltage electric field may then be used to attract the positively charged deuterium nuclei. Many other charged ion sources are known to one of ordinary skill in the art.

The purpose of the RFQ (804), in accordance with one or more embodiments, is to provide initial acceleration of the charged ions and to focus the beam of charged ions. Pommerenke et al. "RF Design Studies on the 750 MHz Radio Frequency Quadrupole Linac for Proton-induced X-Ray Emission Analysis", Physical Review Accelerator and Beams, 2019. Vol. 22, 052003 (May 29, 2019) describe the design of a 1 meter long RFQ capable of generating a beam of protons with energies of 2 MeV. In other embodiments, the quadrupole array ion focusing device described by Maschkle, "Means and Methods for the Focusing and Acceleration of Parallel Beams of Charge Particle", U.S. Pat. No. 4,392,080 (Jul. 5, 1983) may be used.

The beam of charged ions exiting the RFQ (808) may then enter a linear accelerator (806), in accordance with one or more embodiments. The purpose of the linear accelerator (806) is to raise the charged ions from their input energies to the desired high energy levels, in excess of 25 MeV. In accordance with one or more embodiments, the linear accelerator (806) may raise the energy of the beam of charge ions (808) to 50 MeV.

The beam of high energy charged ions (808) is caused to strike a target (810) constructed to emit a large fluence rate pulse of ultrafast neutrons (812) when struck by a beam of high energy charged ions (808). The target (810) may, in the preferred embodiment, be composed of $^7$Li H. In other embodiments the target may be composed of $^7$Li, or $^7$Li D, or of other materials, known to one of ordinary skill in the art, that emit a large fluence rate of ultrafast neutrons when struck by a beam of high energy charged ions.

Figure 9:
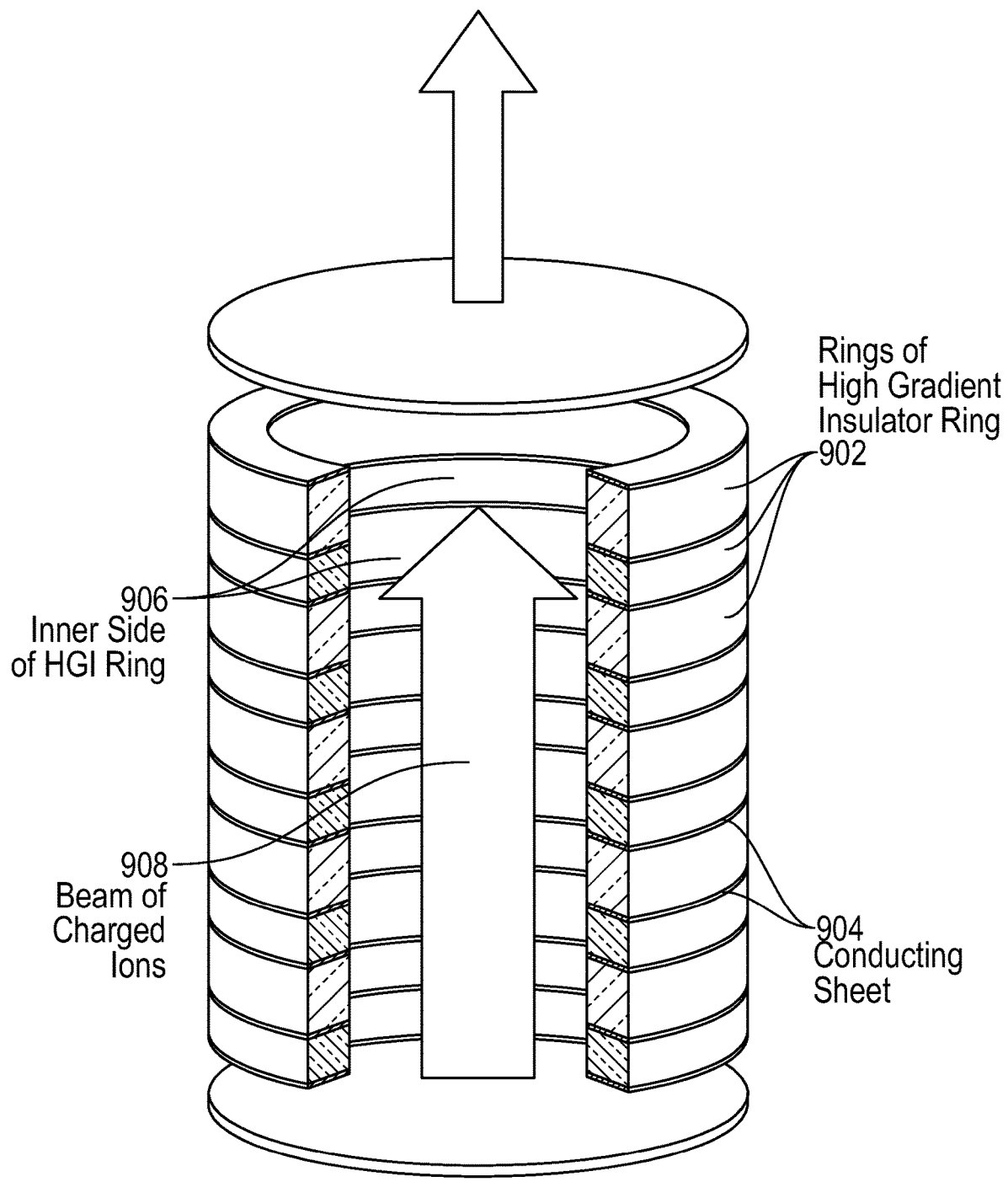
FIG. 9 shows a linear accelerator, in accordance with one or more embodiments.

FIG. 9 shows a linear accelerator, in accordance with one or more embodiments. In linear accelerators, the required length of the accelerator is determined required energy of the output high energy charged ions and by the maximum achievable strength of the electric RF field. Currently, typical values of 10-20 MV/m can be achieved. A device to increase the maximum possible electric field, in accordance with one or more embodiment, is based on application of new types of insulators in accelerator structures. These Dielectric Wall Accelerators (DWA) can be constructed by stacking rings of high gradient insulators "HGI" (902), such as castable dielectric insulators, and inserting conducting sheets (904) at frequent intervals along the stack. Each of these sheets is connected to a high voltage switching circuit (Blumlein circuit). When these laser-driven switches are closed, an electric field is produced on the inner side of the HGI ring. By successive closing of the switches along the stack, the region of strong electric field is shifted along the stack and protons traveling in phase with this wave will be accelerated through these rings to form a charged particle beam (908), as taught be Caporaso et al. "Enhanced Dielectric-Wall Linear Accelerator", U.S. Pat. No. 7,576,499 (Sep. 22, 1998). The design shown in FIG. 9 may raise the maximum achievable strength of the electric RF field to approximately 100 MeV/m, implying the length of a DWA required to generate protons with an energy of 50 MeV is approximately 50 cm.

In other embodiments the charged ion linear accelerator may be based on other physical principles. For example, charged ions may be accelerated by using pulsed electron plasma created by laser pulses striking a gas jet or thin metal target. Clouds of electrons in the plasma generate high electric fields for accelerating protons as they pass through them. Accelerators based on this principle are denoted Plasma Wake Accelerators.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

Figure 10:
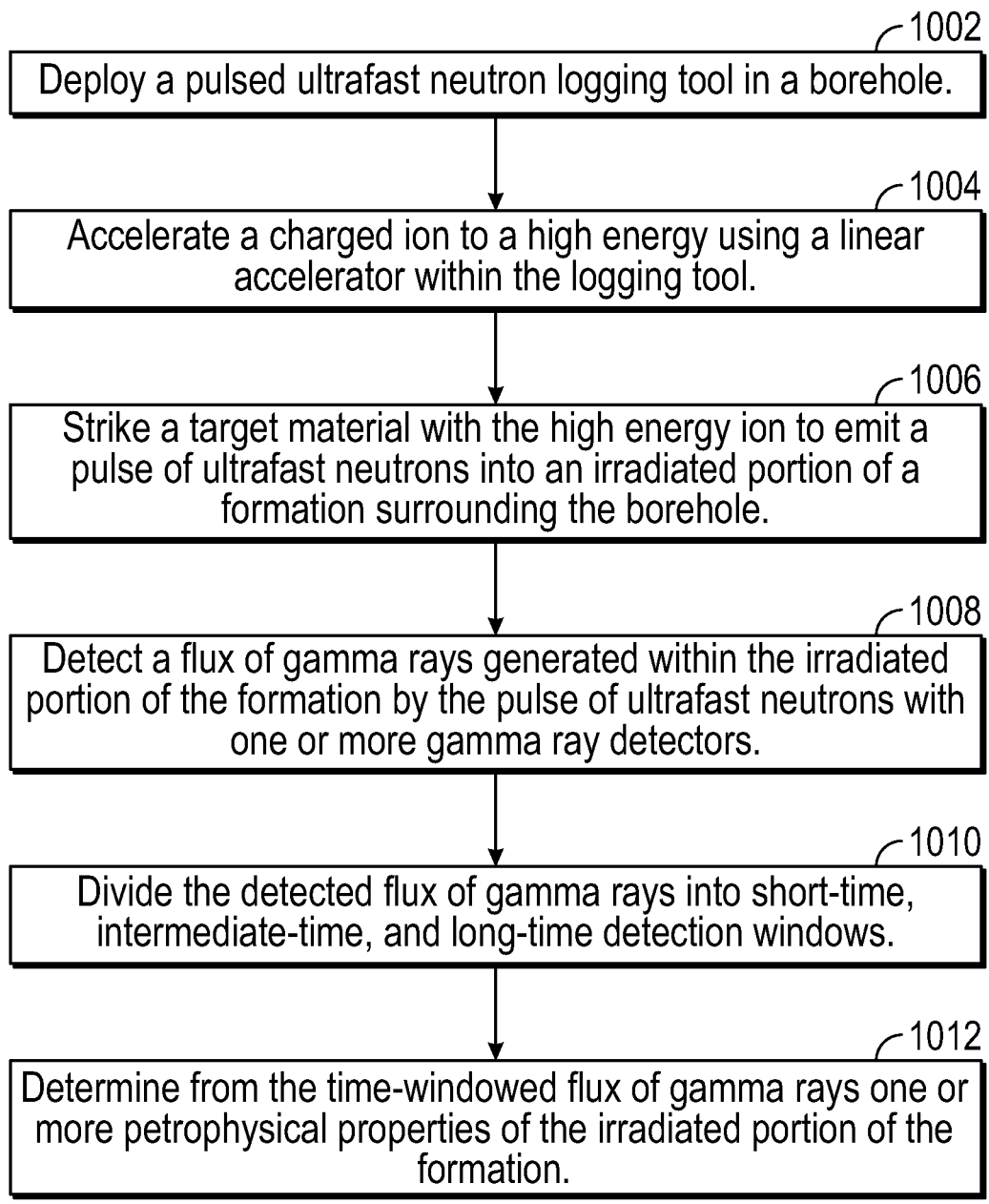
FIG. 10 shows a flowchart describing the use of a pulsed ultrafast neutron logging tool in a borehole, in accordance with one or more embodiments.

FIG. 10 shows a flowchart describing the use of a pulsed ultrafast neutron logging tool, in accordance with one or more embodiments. In Step 1002 a pulsed ultrafast neutron logging tool is deployed in a borehole. The logging tool may be deployed attached to a wireline, a slick-line, a coil-tubing, or a drill-pipe attached to a bottom-hole assembly that may include the logging tool. The tool may be deployed in an open (un-cased), or in a cased, borehole.

In Step 1004, in accordance with one or more embodiments, one or more charged ions are accelerated to high energy using a linear accelerator within the logging tool. The charged ions are accelerated to an energy of at least 25 MeV. In the preferred embodiment the charged ions are accelerated to 50 MeV or more. In the preferred embodiment the charged ions are hydrogen ions, otherwise called protons. In the preferred embodiment the linear accelerator is a Dielectric Wall Accelerator.

In Step 1006, in accordance with one or more embodiments, the high energy ions are caused to strike a target material stimulating the emission of a pulse of ultrafast neutrons in an irradiated portion of the formation surrounding the borehole. In the preferred embodiment the target is composed of material containing a high proportion of an isotope of lithium, $^7$Li. In the preferred embodiment the protons with an energy of 50 MeV will stimulate the emission of ultrafast neutrons with an energy of 45 MeV.

In Step 1008, in accordance with one or more embodiments, the pulse of ultrafast neutrons may stimulate a flux of gamma rays generated within the irradiated portion of the formation surrounding the borehole, and at least a portion of the flux of gamma rays may be detected by one of the plurality of gamma ray detectors mounted on, or in, the logging tool. In the preferred embodiment the plurality of gamma ray detectors may include a proximal, near, far, and long offset gamma ray detectors.

In Step 1010 the detected flux of gamma rays may be divided into short-time, intermediate-time, and long-time detection windows, in accordance with one or more embodiments. In the preferred embodiment, the short-time window may be coincident with the timing of the pulse of ultrafast neutrons, the intermediate-time window may begin at the end of the pulse of ultrafast neutrons and extend for 50 μsec or longer, and the long-time window may begin after the end of the pulse of ultrafast neutrons and extend for 30 sec, or longer.

In Step 1012, in accordance with one or more embodiments, one or more petrophysical properties of the irradiated portion of the formation may be determined from the time-windowed flux of gamma rays detected by the plurality of gamma ray detectors. In the preferred embodiment, the one or more petrophysical properties may include, the carbon and oxygen content and consequently pore fluids volumes; i.e. water and hydrocarbon, the formation porosity, and the elemental composition or a spectral gamma ray mineralogy analysis and formation water saturation. All measurements acquired at a deep and a representative sample of the formation using the ultrafast pulsed neutron tool.

What is claimed:

1. A method, comprising:
   emitting, from a source of ultrafast neutrons within a logging tool deployed in a borehole, a pulse of ultrafast neutrons into an irradiated portion of a formation surrounding the borehole, wherein the irradiated portion of the formation is a cylindrical volume with a greater external radius than a radius of a cylindrical volume irradiated by a neutron with a lower energy than the ultrafast neutrons;
   detecting, with one or more gamma ray detectors located at increasing distances from the source of ultrafast neutrons, a flux of stimulated gamma rays generated within the irradiated portion of the formation by the pulse of ultrafast neutrons;
   determining, from the detected flux of stimulated gamma rays, one or more petrophysical properties of the irradiated portion of the formation.

2. The method of claim 1, wherein the ultrafast neutrons have an energy greater than 20 MeV.

3. The method of claim 1, wherein the emitting of the pulse of ultrafast neutrons comprises:
   accelerating, with a linear accelerator, a charged ion to a high energy; and
   causing the charged ion to impact a target material, wherein the target material is a material that emits ultrafast neutrons when impacted by charged ions.

4. The method of claim 3, wherein the charged ion is selected from the group consisting of a hydrogen ion and a deuterium ion.

5. The method of claim 3, wherein the target material is a lithium isotope.

6. The method of claim 1, wherein the detecting of the flux of stimulated gamma rays comprises:
   detecting the flux of stimulated gamma rays arriving at the plurality of gamma ray detectors during a short time window after a start of the emitting of the pulse of ultrafast neutrons;
   detecting the flux of stimulated gamma rays arriving at the plurality of gamma ray detectors during an intermediate time window after the start of the emitting of the pulse of ultrafast neutrons; and
   detecting the flux of stimulated gamma rays arriving at the plurality of gamma ray detectors during a long time window after the start of the emitting of the pulse of ultrafast neutrons.

7. The method of claim 1, wherein the determining of the one or more petrophysical properties of the irradiated portion of the formation, further comprises:
   interpreting the flux of stimulated gamma rays arriving during a short time window after the emitting of the pulse of ultrafast neutrons as originating with an inelastic scattering of an ultrafast neutron by an atomic nuclei within the irradiated portion of the formation;
   interpreting the flux of stimulated gamma rays arriving during an intermediate time window after the emitting of the pulse of ultrafast neutrons as originating with an elastic scattering of an ultrafast neutron by an atomic nuclei within the irradiated portion of the formation; and
   interpreting the flux of stimulated gamma rays arriving during a long time window after the emitting of the pulse of ultrafast neutrons as originating with thermal capture of an ultrafast neutron by an atomic nuclei within the irradiated portion of the formation.

8. The method of claim 1, wherein the external radius of the portion of the formation irradiated by the ultrafast neutrons is 30 percent or more larger than the radius of the portion of the formation irradiated by neutrons with a lower energy than the ultrafast neutrons.

9. The method of claim 1, wherein the one or more petrophysical properties are selected from the group consisting of formation water saturation, and mineralogical composition.

10. A logging tool system, comprising:
    a computer processor;
    a wireline connected to the computer processor;
    a logging tool housing;
    a source of ultrafast neutrons mounted in the logging tool housing that emits a pulse of ultrafast neutrons into an irradiated portion of a formation surrounding the borehole, wherein the irradiated portion of the formation is a cylindrical volume with a greater external radius than a radius of a cylindrical volume irradiated by a neutron with a lower energy than the ultrafast neutrons;
    one or more gamma ray detectors mounted in the logging tool housing at one or more distances from the source of ultrafast neutrons that detect and determine a characteristic of a flux of stimulated gamma rays stimulated in a formation by the pulse of ultrafast neutrons; and
    a non-transitory computer memory that receives and stores a characteristic of the flux of stimulated gamma rays detected by the plurality of gamma ray detector.

11. The logging tool system of claim 10, wherein the source of ultrafast neutrons comprises:
    a linear accelerator to accelerate a charged ion to a high energy; and
    a target material that emits ultrafast neutrons when struck by the high energy charged ion.

12. The logging tool system of claim 10, wherein the ultrafast neutrons have an energy greater than 20 MeV.

13. The logging tool system of claim 10, wherein the charged ion is selected from the group consisting of a hydrogen ion and a deuterium ion.

14. The logging tool system of claim 10, wherein the target material is a lithium isotope.

15. The logging tool system of claim 10, wherein the linear accelerator comprises a dielectric wall linear accelerator.

16. The logging tool system of claim 10, wherein the one or more gamma ray detectors mounted in the logging tool housing at a one or more distances from the source of ultrafast neutrons are mounted at greater distances than one or more gamma ray detectors mounted in the logging tool housing at a one or more distances from the source of neutrons slower than ultrafast neutrons.

17. The logging tool system of claim 10, wherein the external radius of the portion of the formation irradiated by the ultrafast neutrons is 30 percent or more larger than the radius of the portion of the formation irradiated by neutrons with a lower energy than the ultrafast neutrons.

18. A logging tool system, comprising:
a logging tool housing connected to the bottom-hole assembly of a drill-string;
a computer processor mounted in the logging tool housing;
a source of ultrafast neutrons mounted in the logging tool housing that emits a pulse of ultrafast neutrons into an irradiated portion of a formation surrounding the borehole, wherein the irradiated portion of the formation is a cylindrical volume with a greater external radius than a radius of a cylindrical volume irradiated by a neutron with a lower energy than the ultrafast neutrons;
one or more gamma ray detectors mounted in the logging tool housing at one or more distances from the source of ultrafast neutrons that detect and determine a characteristic of a flux of stimulated gamma rays stimulated in a formation by the pulse ultrafast neutrons; and
a non-transitory computer memory that receives and stores the characteristic of the flux of stimulated gamma rays detected by the gamma ray detector.

19. The logging tool system of claim 18, wherein the ultrafast neutron source comprises:
a linear accelerator to accelerate a charged ion to a high energy; and
a target material that emits ultrafast neutrons when struck by the high energy charged ion.

20. The logging tool system of claim 19, wherein the charged ion is selected from the group consisting of a hydrogen ion and a deuterium ion.

21. The logging tool system of claim 19, wherein the target material is a lithium isotope.

22. The logging tool system of claim 19: wherein the linear accelerator comprises a dielectric wall linear accelerator.

23. The logging tool system of claim 18, wherein the external radius of the portion of the formation irradiated by the ultrafast neutrons is 30 percent or more larger than the radius of the portion of the formation irradiated by neutrons with a lower energy than the ultrafast neutrons.

* * * * *